US011927003B2

(12) United States Patent
Kendrick

(10) Patent No.: US 11,927,003 B2
(45) Date of Patent: *Mar. 12, 2024

(54) PLUNGER COVER APPARATUS, SYSTEM, AND METHOD

(71) Applicant: Hal Coburn Kendrick, Frisco, TX (US)

(72) Inventor: Hal Coburn Kendrick, Frisco, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/694,053

(22) Filed: Mar. 14, 2022

(65) Prior Publication Data

US 2022/0195710 A1 Jun. 23, 2022

Related U.S. Application Data

(63) Continuation of application No. 16/829,839, filed on Mar. 25, 2020, now Pat. No. 11,274,427.

(51) Int. Cl.

*E03C 1/304* (2006.01)
*B08B 9/032* (2006.01)
*B65D 55/00* (2006.01)

(52) U.S. Cl.

CPC ............ *E03C 1/304* (2013.01); *B08B 9/0321* (2013.01); *B08B 2209/032* (2013.01); *B65D 55/00* (2013.01)

(58) Field of Classification Search

CPC ...... B65D 2501/24363; B65D 81/3461; B65D 77/003; B65D 63/00; B65D 33/2589;

(Continued)

(56) References Cited

U.S. PATENT DOCUMENTS 1,148,924 A * 8/1915 Paradise .............. B65D 33/165 114/294
2,253,688 A * 8/1941 Collins .................. A01K 97/04 383/117

(Continued)

FOREIGN PATENT DOCUMENTS

EP 1079783 A1 3/2001
ES 2719761 T 7/2019

(Continued)

OTHER PUBLICATIONS

The Cable Tie Gun, https://www.youtube.com/watch?v=R4rS_jd9Swg, downloaded Dec. 17, 2019.

(Continued)

*Primary Examiner* — Kareen K Thomas
(74) *Attorney, Agent, or Firm* — J. Andrew Reed; James R. Gourley; Carstens, Allen & Gourley, LLP

(57) ABSTRACT

The present disclosure is directed to an apparatus, system, or method for covering and utilizing a plunger. The plunger can be inserted into a cover configured or sized to receive the plunger. The cover is attached to a handle with a closure mechanism. The closure mechanism is used to close the open end of the cover after removal of the plunger from the cover. A toilet or other drain or pipe system may be unclogged using the covered plunger. When the plunger and the cover are removed from a toilet, and the plunger is removed from the cover, the cover reverses or inverts. When reversed or inverted, the cover contains water or waste material from the toilet within the cover.

15 Claims, 9 Drawing Sheets

(58) Field of Classification Search
CPC .... B65D 33/2575; B65D 33/12; B65D 33/06; B65D 31/00; B65D 25/28; B65D 5/606; B65D 55/00; E03C 1/304; B08B 9/0321; B08B 2209/032; B08B 13/00
See application file for complete search history.

(56) References Cited

U.S. PATENT DOCUMENTS 2,732,988 A 1/1956 Feinstein
2,981,990 A 5/1961 Balderree
3,072,986 A 1/1963 Lefnaer
3,310,224 A 3/1967 Laguerre
3,343,719 A 9/1967 Kastamo et al.
3,462,068 A 8/1969 Suominen
3,477,196 A 11/1969 Lerner
3,529,899 A 9/1970 Gruska
3,548,906 A 12/1970 Murphy
4,093,005 A 6/1978 Eberhardt et al.
4,112,762 A 9/1978 Turner et al.
4,156,446 A * 5/1979 Nathan .................. B63C 11/00 383/117
4,380,304 A 4/1983 Anderson
4,458,368 A * 7/1984 Webb ........................ E03C 1/30 4/300.3
4,640,320 A 2/1987 Avison et al.
5,050,999 A * 9/1991 Van Loon, III ........ A45C 3/045 493/239
5,114,006 A * 5/1992 Wilk ....................... E03C 1/308 206/349
5,269,430 A 12/1993 Schlaupitz et al.
5,288,150 A * 2/1994 Bearman .................. A45C 3/00 383/117
5,339,483 A 8/1994 Byun
5,368,597 A 11/1994 Pagedas
5,400,572 A 3/1995 Peck et al.
5,456,356 A 10/1995 Kurzawa
5,458,278 A * 10/1995 LaConte ................... A45F 3/04 224/652
5,505,305 A 4/1996 Scholz et al.
5,611,626 A 3/1997 Warr
5,692,660 A * 12/1997 Stewart .................... A45C 3/00 190/103
5,724,793 A 3/1998 Inman et al.
5,836,322 A 11/1998 Borger et al.
5,927,492 A * 7/1999 Moore ................... A47B 81/02 220/636
5,971,141 A 10/1999 Shafik
6,035,456 A * 3/2000 Taylor ..................... E03C 1/308 206/349
6,038,709 A * 3/2000 Kent ...................... A47K 11/10 4/255.05
6,055,680 A 5/2000 Tolbert
6,068,402 A * 5/2000 Freese ................ B65D 81/3897 383/110
6,145,513 A 11/2000 Chu et al.
6,186,662 B1 * 2/2001 Jackson ................... A45C 3/00 383/117
6,216,283 B1 4/2001 Tash
6,345,911 B1 2/2002 Young et al.
6,564,838 B1 * 5/2003 Cruickshank ...... A45C 13/1046 150/128
6,622,316 B1 9/2003 Brown
6,779,202 B1 8/2004 Alldredge
6,813,785 B1 * 11/2004 Baker ....................... E03D 9/00 4/255.05
6,845,538 B2 1/2005 Nakamura
7,120,943 B2 10/2006 Allenbaugh et al.
7,124,450 B2 10/2006 Davidson
7,278,377 B1 10/2007 Stephens
7,478,960 B2 1/2009 Glover
7,730,739 B2 * 6/2010 Fuchs ....................... F25C 1/22 62/530
7,827,648 B2 11/2010 Soller et al.
7,918,620 B2 4/2011 Del Ponte
8,640,506 B1 2/2014 Grear et al.
9,144,278 B2 * 9/2015 Morrow ................. A45C 7/009
10,053,846 B1 8/2018 Rim et al.
10,065,329 B2 9/2018 Offerman
2004/0025235 A1 2/2004 Tash
2004/0035143 A1 * 2/2004 Mogil .................... A45C 13/02 383/110
2004/0114836 A1 * 6/2004 LeClaire ............. G07F 17/3216 383/93
2005/0084182 A1 4/2005 Penson
2005/0101838 A1 5/2005 Camillocci et al.
2005/0167428 A1 * 8/2005 Kellogg ................ D06F 95/004 220/9.4
2005/0263528 A1 * 12/2005 Maldonado ............ A45C 11/20 220/592.2
2007/0065052 A1 3/2007 Ulas
2007/0094779 A1 5/2007 Dauphin
2007/0143912 A1 6/2007 Thorp et al.
2008/0050054 A1 2/2008 Koopah
2009/0026098 A1 1/2009 Tierney
2009/0095646 A1 4/2009 Reynolds et al.
2010/0284631 A1 11/2010 Lee
2014/0193103 A1 7/2014 DeSanti
2019/0345704 A1 11/2019 Morse

FOREIGN PATENT DOCUMENTS

JP 2006238726 A 9/2006
JP 2019092399 A 6/2019
WO 2018112186 A1 6/2018

OTHER PUBLICATIONS

The Cable Tie Gun, https://www.youtube.com/watch?v=R4rS_jd9Swg, downloaded Jan. 12, 2021.

* cited by examiner

PLUNGER COVER APPARATUS, SYSTEM, AND METHOD

CROSS REFERENCE

This disclosure is a continuation of U.S. application Ser. No. 16/829,839, filed Mar. 25, 2020 which is hereby incorporated herein by reference in its entirety for all purposes.

BACKGROUND

Technical Field

The present disclosure relates to a cover for a plunger. More particularly, and not by way of limitation, the present disclosure is directed to an apparatus, system or method for a reversible and securable cover for a plunger or toilet brush.

Description of Related Art

Many individuals dislike cleaning or unclogging toilets because of a fear of touching or dripping waste material or dirty water on themselves or common surfaces. It would be advantageous to have an apparatus, system, or method that allows individuals to avoid these unsanitary conditions associated with unclogging or cleaning a toilet.

BRIEF SUMMARY

The present disclosure is directed to a system for covering a plunger during use. The plunger can be inserted into a cover configured and sized to receive the plunger. The cover is capable of being coupled to a handle with a closure mechanism. The closure mechanism is capable of attaching to the cover for closing or securing the cover after the removal of a plunger. When the plunger is removed from the cover, the removal causes the cover to be inverted or reversed.

Thus, in one aspect, the present disclosure is directed to an apparatus for covering a plunger. The apparatus can include a handle with a coupling point that allows for an attachment to a cover configured and sized to receive the plunger. The cover can have an elongated structure, and a closure mechanism that attaches to the cover allowing the closure, securing, or cinching of the cover.

In another aspect, the present disclosure is directed to a method for utilizing a plunger. The method beginning with the insertion of a plunger into a cover. The cover allows for a coupling or attachment to a handle through a closure mechanism. The closure mechanism is configured to allow the cover to be closed, secured, or cinched. A toilet, drain or pipe system may be unclogged or cleaned utilizing the plunger or other device housed within the cover. When the plunger and the cover are removed from a toilet, and the plunger is removed from the cover, it reverses or inverts. When reversed or inverted, the cover retains water or waste material from the toilet within the cover.

BRIEF DESCRIPTION OF THE DRAWINGS

The novel features believed characteristic of the disclosure are set forth in the appended claims. The disclosure itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Figure 1:
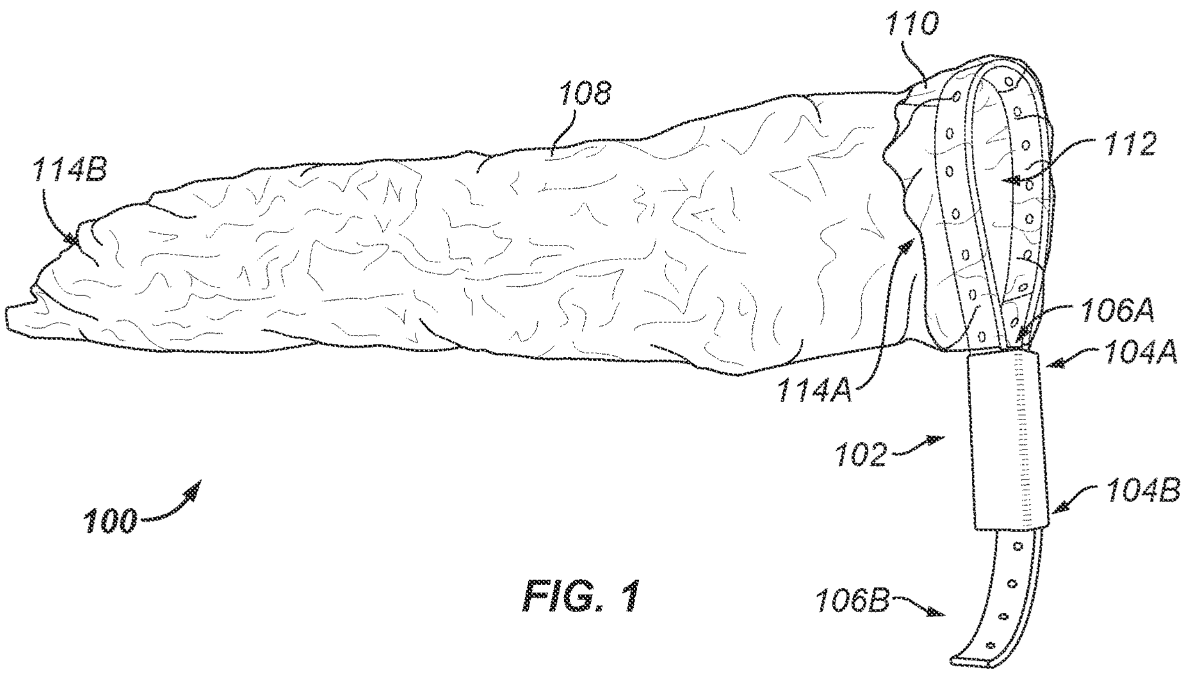
FIG. 1 is an illustration of a plunger cover system.

An embodiment of the disclosure will now be described. FIG. 1 is an illustration of a plunger cover system 100. The plunger cover system 100 can allow a plunger (not illustrated) to be covered during usage to prevent water or other waste material from touching or becoming affixed to the plunger. It would be understood that any fluid could also be prevented from passing through a cover 108, as the cover 108 would be constructed of a nonpermeable material having a thickness sufficient to prevent the passage of fluids or waste material. Additionally, the plunger cover system 100 can prevent drippage onto a floor or other surface. The plunger cover system 100 can include a handle 102 with a means for holding or retaining a cover 108. A plunger may be inserted into the cover 108 for use in plunging or clearing a toilet blockage. After use, the plunger may be removed from the cover 108, and during removal, the cover can be reversed to capture water or waste material on the exterior side within the cover after it is reversed. The cover 108, after removal of the plunger, may be closed to keep water or waste materials within the cover 108.

The cover 108 can be made of materials that are water resistant or impermeable, such as, but not limited to, a thin film polymer, or polyurethane. The material may be of a thickness that allows for a plunger to be utilized in an aggressive manner without tearing, ripping, or otherwise opening to allow water or waste onto the plunger. While a plunger has been discussed and illustrated, in other examples toilet brushes or cleaners, litter scoops, or poop scoops may be utilized with the plunger cover system 100. In at least one embodiment, the cover 108 or handle 102, individually or in combination, may also have a closure mechanism (illustrated as 106A/106B) that allows for the cover 108 to be closed after the use and removal of the plunger. In at least one example, the handle 102 may include a first coupling link that allows for engagement with a second coupling link coupled to the closure mechanism. In some examples, the coupling link may be a tongue and groove connection, while in others the coupling link may be a friction fit configuration. For example, a closure mechanism may couple to a block or other shape that is friction fit to the handle. The cover 108 may also have a first cover end 114A and a second cover end 114B. In at least one embodiment, the first cover end 114A may have an opening 112 that allows for the insertion of a plunger into the cover 108, while the second cover end 114B is sealed or closed. The cover 108 or a closure mechanism 106A/106B, may define the opening 112. The sealing at the first cover end 114A, in at least one embodiment, can create a cover aperture or void 110 that allows for the passage of a strap or closure mechanism through or around the first cover end 114A.

The handle 102 may have a first handle end 104A, and a second handle end 104B. In at least one embodiment, the handle 102 is an elongated hollow cylinder or tubular structure. The handle 102 may be constructed of plastic, wood, metal, composite materials, carbon fiber, or materials of similar characteristics, or combinations thereof. In at least one example, the handle 102 may have an object or portion of an object, such as a closure mechanism 106A/106B, or a filling material that allows for the handle 102 to be filled in a manner that prevents the collapse of the handle 102 when it is utilized. The first handle end 104A and the second handle end 104B may each have an opening that allows for the hollow portion of the handle's cylindrical or tubular structure to be accessed. In at least one example, the handle 102 can define an aperture for receiving a closure mechanism, for example, a strap.

The closure mechanism 106A/106B allows for the cover 108 to be closed. In at least one example, the first portion of the closure mechanism 106A may be a locking or ratcheting mechanism that allows for the passage of a second portion of the closure mechanism 106B such as, but not limited to, a locking member or strap. In other examples, the first portion of the closure mechanism 106A can be a friction fit aperture defined by the handle 102 for receiving a strap or second portion of a closure mechanism 106B. For example, the first portion of the closure mechanism 106A may be a ratcheting pin system that corresponds to the second portion of the closure mechanism 106B that includes a strap with pin holes to assist in the locking or movement of the strap through the ratcheting pin system. Another example could be a zip or pull tie like system where the first portion of the closure mechanism 106A is the ratcheting or locking head, and the second portion of the closure mechanism 106B is the strap portion with locking notches in the strap. Other securing mechanisms may also be used without departing from the spirit or scope of the present disclosure.

Figure 2:
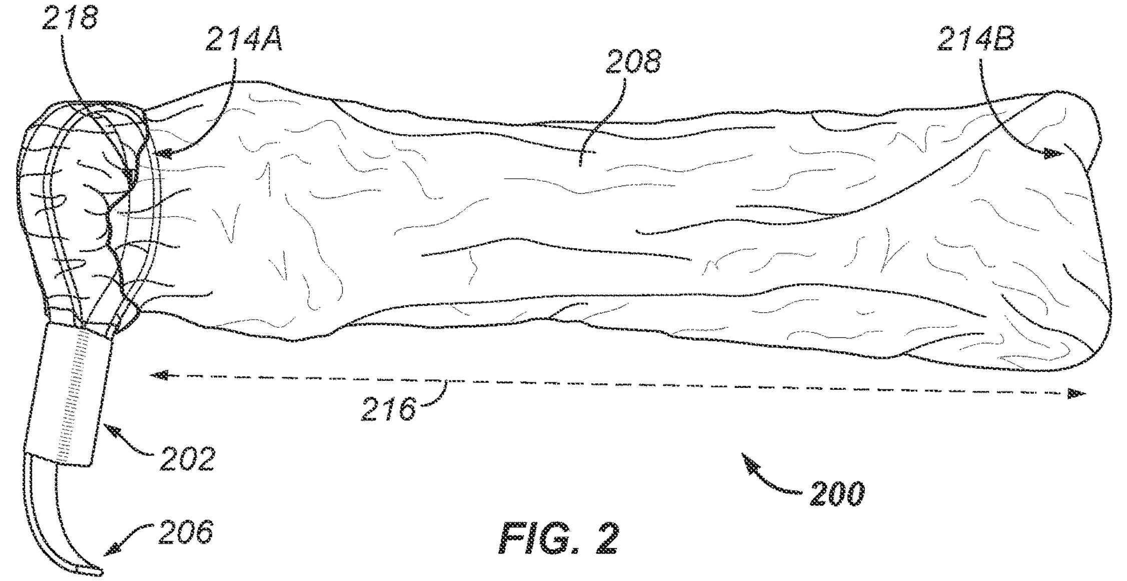
FIG. 2 is an illustration of the plunger cover system.

FIG. 2 is an illustration of the plunger cover system 200. The plunger cover system 200 can include a handle 202 coupled to a cover 208 through a closure mechanism 206. The cover 208 may have a first cover end 214A and a second cover end 214B. The cover 208 can have an elongated structure 216. The elongated structure 216 can allow for the insertion of a plunger or other devices within the cover 208. While the cover 208 is depicted as having a cross section that is generally circular in shape, the cover 208 may include any number of other shapes, such as a square, oval, rectangular, triangular, or other shapes having a polygon structure for its cross section. At the first cover end 214A, the cover may have a sealing point 218 that creates an aperture or opening for the passage of a closure mechanism 206 through or around the cover 208. In at least one example, the sealing point 218 allows for the closure mechanism 206 to create a ring or other cross-sectional structure for a cover opening.

Figure 3:
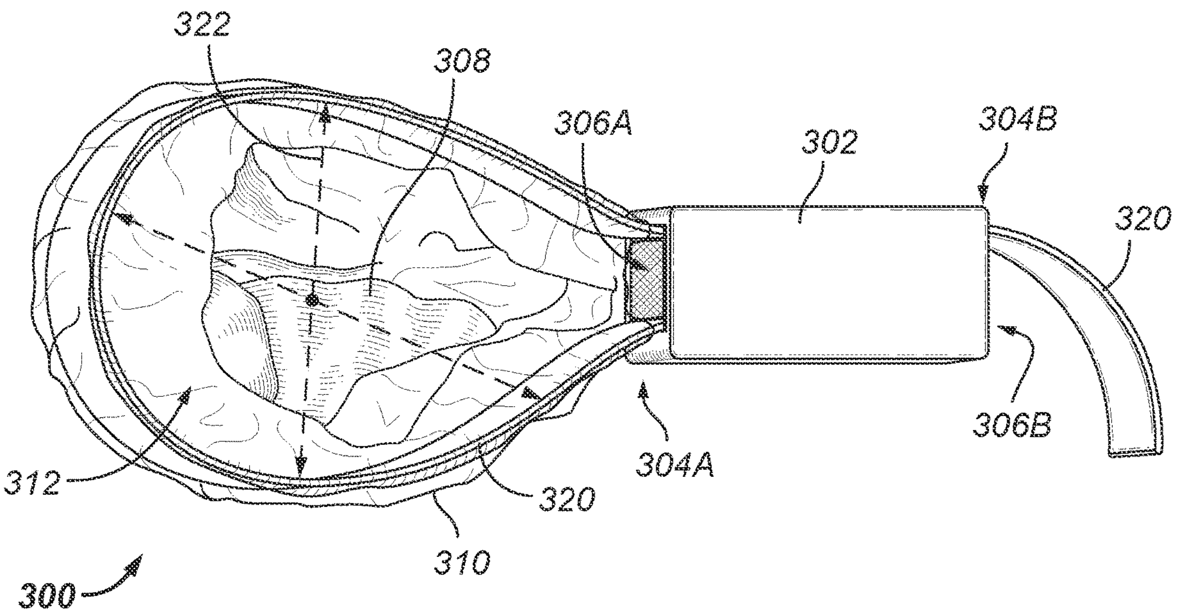
FIG. 3 is a top view illustration of a plunger cover system.

FIG. 3 is a top view illustration of a plunger cover system 300. The plunger cover system 300 may include a handle 302 interfacing with a first portion of a closure mechanism 306A, or a second portion of a closure mechanism 306B. The handle 302 can be a hollow or semi-hollow structure having a first handle end 304A, and a second handle end 304B. In at least one embodiment, the first handle end 304A interfaces with a first portion of a closure mechanism 306A. The second handle end 304B interfaces with a second portion of a closure mechanism 306B.

The closure mechanism 306A/306B, in at least one example, can be a strap and locking means; for example, a strap can be utilized that has apertures or punctures that allow for a locking or movement mechanism to be utilized to prevent or allow movement of the strap 320. In other examples, the securing means may include a block or adhesive for securing a strap to the block that is capable of disengaging upon a sufficient force being applied to strap 320 or the adhesive points. In yet another example, the closure mechanism 306A/306B may have a receiving aperture defined by the handle 302 for receiving the strap 320, and allowing for a friction fit securing of the strap 320 as it passes through the handle 302. Further to this example, a second portion of the closure mechanism 306B may include a tapering of the receiving aperture at or towards the second handle end 304B, thereby increasing the friction applied to the strap 320.

The cover 308 may also have a closure mechanism aperture or strap aperture 310 that allows for a closure mechanism or strap 320 to pass around a first end of the cover 308. For example, in a first state a strap 320 may pass through the closure mechanism aperture 310 to create or define a cover opening 312 with an opening structure 322. In a second state, when a user (not illustrated) applies a force to the strap 320, the opening 312 or opening structure 322 can shrink or collapse to a negligible amount, thereby closing or securing the cover 308.

Figure 4:
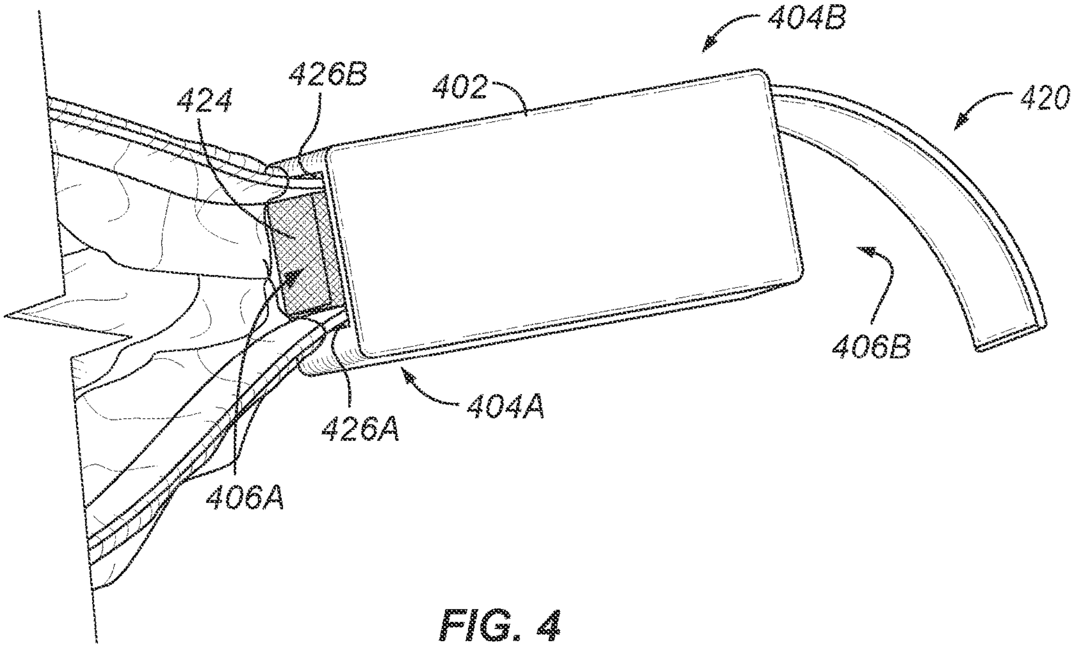
FIG. 4 is an illustration of a handle.

FIG. 4 is an illustration of a handle 402. In at least one embodiment, a handle 402 may have a first handle end 404A, and a second handle end 404B. A first handle end 404A may allow for the insertion of a strap 420. In some examples, handle 402 may have a block 424, or adhesive points for generating a securing force on a strap 420. In at least one example, the strap 420 may be included as part of the closure mechanism 406A/406B.

The block 424, in at least one example, may be part of the handle 402 or be formed as part of the handle 402. In other examples, the block 424 may be part of a closure mechanism 406A/406B by having adhesive on one or more sides to secure a strap or other closure mechanism to the block 424 for insertion into the handle 402. The block 424 may also contain one or more receiving apertures 426A/426B that allow for a strap or other closure to be accessed or retrieved in order to apply a force to the strap or closure. The receiving apertures 426A/426B may extend through the body of the handle 402 to the second handle end 404B. The receiving apertures 426A/426B can allow for a strap 420 to pass through the handle 402 freely or with an applied friction.

Figure 5:
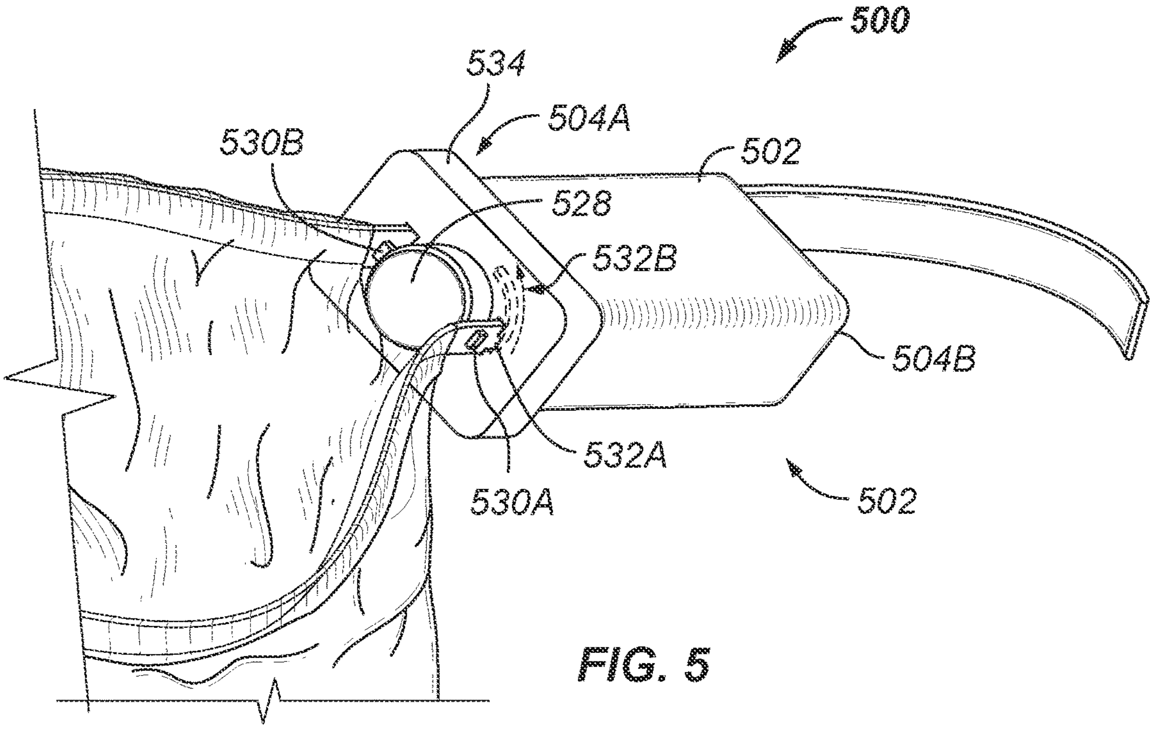
FIG. 5 is an illustration of a plunger cover system.

FIG. 5 is an illustration of a plunger cover system 500. A handle 502 may have a first handle end 504A, and a second handle end 504B. In at least one embodiment, the handle 502 may be hollow or define a void for receiving a locking cylinder 528 with locking blocks 530A/530B. In some examples, the blocks 530A/530B may also have one or more locking pin(s) extending from them for coupling or connecting a strap or similar closure. A strap and block aperture 532A may allow for the strap or block to be engaged with a receiving block 534. The receiving block 534 can also define a channel 532B that corresponds to the strap and block aperture 532A for securing or engaging the locking block 530A/530B. In at least one example, a mirror or corresponding strap and block aperture 532A and channel 532B may allow for engagement with the locking block 530B opposing locking block 530A. A set can include one or more of an item, and the locking cylinder 528 may include a set of locking block(s), a set of strap and block apertures, or channels.

Figure 6:
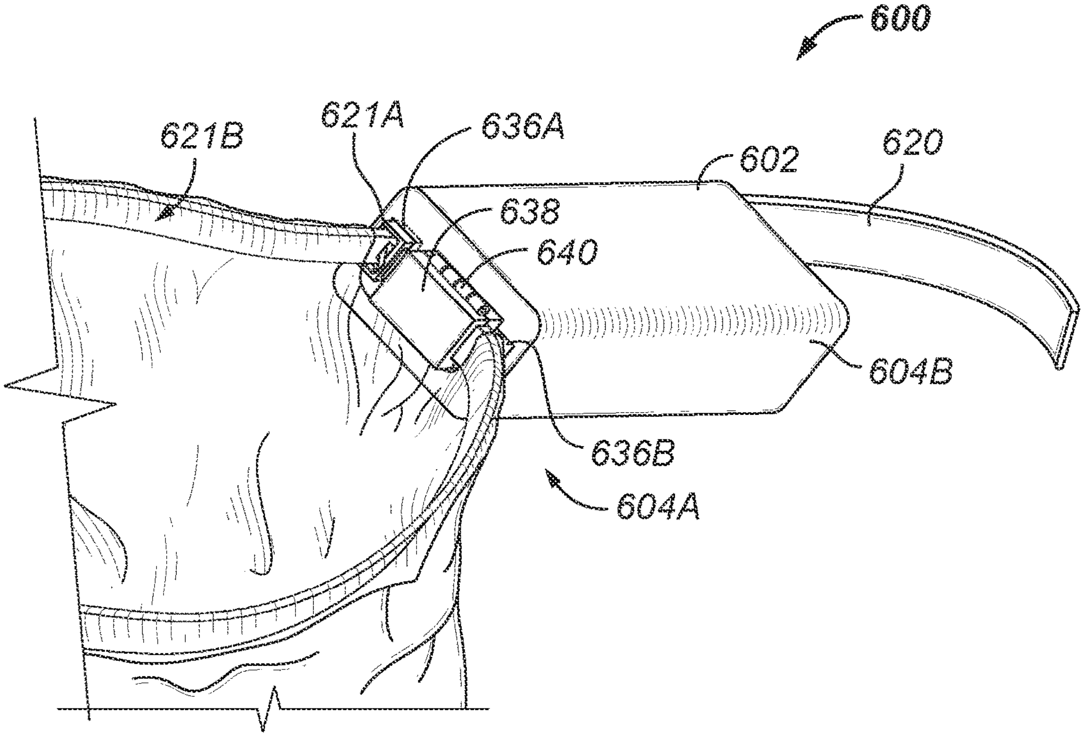
FIG. 6 is an illustration of a plunger cover system.

FIG. 6 is an illustration of plunger cover system 600. The system 600 may include a handle 602 with a strap cover 638 or strap block apertures 636A/636B. In some examples, a strap 620 may also couple to the strap cover 638 or be inserted into the handle 602 via the block apertures 636A/636B. The handle 602 may also include a void or set of voids, defined by the block apertures 636A/636B that allow for a strap 620 to pass through from a first handle end 604A to a second handle end 604B.

The strap 620 can have a locking block 621A for engaging or interacting with a locking portion 621B of a strap 620. For example, the strap 620 may be a rachet, zip, or cable tie strap. In at least one example, the locking portion 621B may include the majority or all of the strap 620; while in other examples, a significant portion of the strap 620 includes the locking portion 621B. One of the strap apertures 636A/636B may receive the locking block 621A depending on the handedness of a user. A portion of the strap 620 may be secured by the strap cover 638 having a hinge 640 that allows for a clamshell like opening of the strap cover 638. In at least one embodiment, the hinge 640 may be activated by a button (not illustrated) on the handle 602.

Figure 7A:
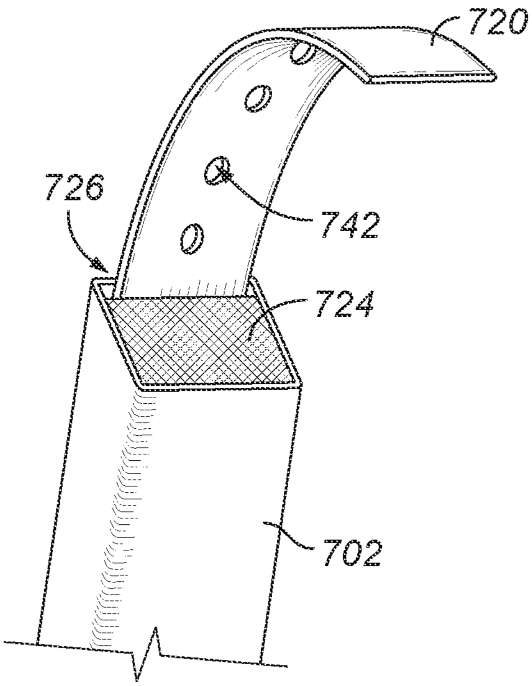
FIG. 7A is an illustration of a second end of a handle.

FIG. 7A is an illustration of a second end of a handle 702. The handle 702 can have a hollow structure with a block 724 that provides support for or fills portions of the handle 702. The handle 702 and block 724 may create a strap aperture 726 that allows for the passage of a strap 720 through the handle 702. In at least one embodiment, the strap 720 may have a set of strap locking points 742 that allow for the strap 720 to be engaged with a locking mechanism (not illustrated) that prevents the strap 720 from returning or being let out after an initial engagement.

Figure 7B:
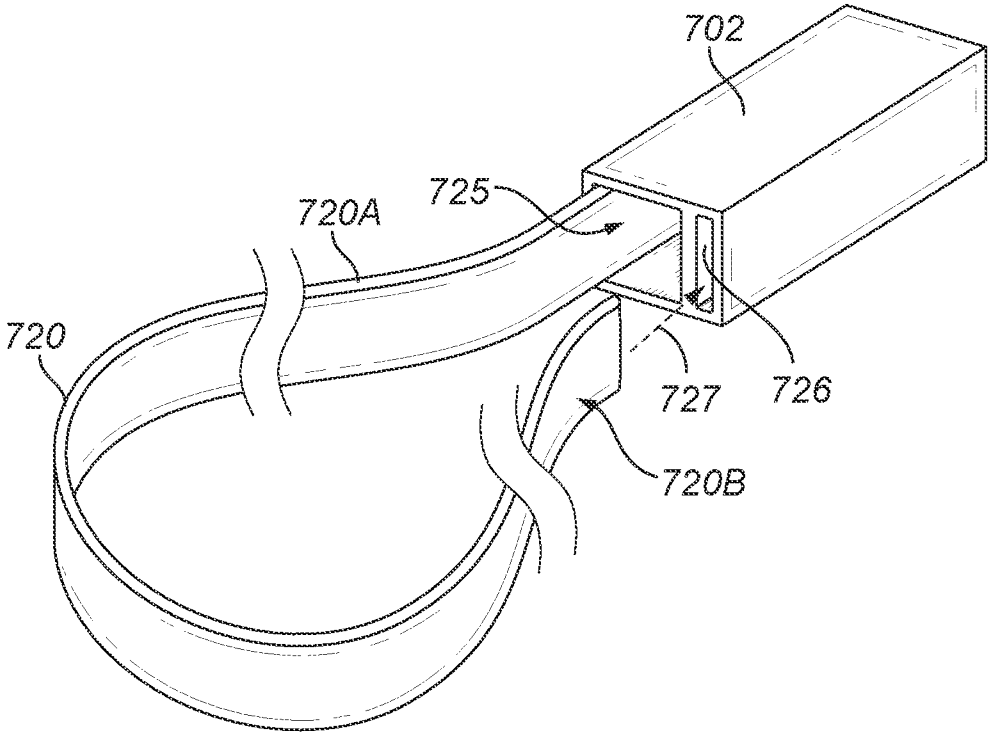
FIG. 7B is an illustration of a handle.

FIG. 7B is an illustration of a first end of a handle 702. The handle 702 may have a hollow structure or void 725 that is configured to receive or engage a first portion 720A of a strap 720. In some examples, a block or filling material may be utilized to secure the first portion 720A of the strap 720. In at least one embodiment, the handle 702 also defines a receiving aperture 726 for receiving a second portion 720B of a strap 720. The receiving aperture 726 may define a void that passes through the length of the handle 702. The receiving aperture 726, individually or in combination with the void can create a friction fit that secures the strap 720. In at least one example, the second portion 720B of the strap 720 may exit an exiting aperture (not illustrated) on the opposite end of the handle 702 from the receiving aperture 726. In some examples, the strap 720 may have a variable width or height along its length that allows for the friction fit caused by the void or receiving aperture 726, to increase in resistance as a user (not illustrated) applies an insertion force 727, or pulling force from the exiting aperture end of the strap 720.

Figure 8:
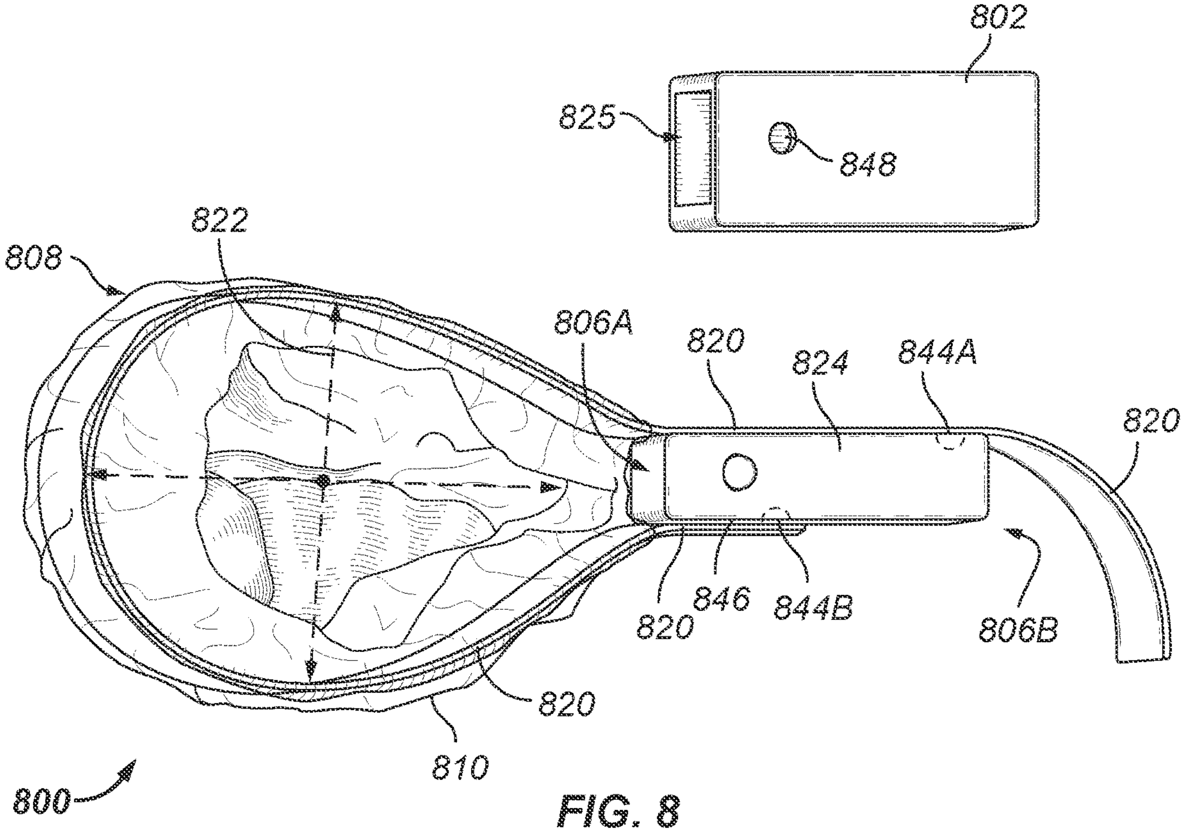
FIG. 8 is an illustration of a plunger cover apparatus.

FIG. 8 is an illustration of a plunger cover apparatus 800. The plunger cover apparatus 800 can include a handle 802, a closure mechanism 806A/806B (collectively 806) for engaging with a strap 820, and a cover 808. The closure mechanism 806 may include a locking or securing means for engaging the strap 820. In at least one embodiment, the closure mechanism may include one or more adhesion points 844A/844B alone or in combination with a lock. The adhesive or adhesion points 844A/844B can allow for the strap 820 to be secured to a block 824, in a manner that would allow the adhesion points 844A/844B to release upon a sufficient force being applied to the strap 820 by a user. The block 824 can be sized and configured to be received by the handle 802, at a handle void 825. The handle void 825 may be sized and configured to receive the block 824 and strap 820. In some alternative examples, a zip, cable, or pull tie may be utilized as part of or as the strap 820 and as part of the closure mechanism 806. The strap 820 can be utilized to create an opening structure 822 for the cover 808. In at least one embodiment, the cover 808 may include a cover aperture 810 that allows for the strap 820 to pass through or around one end of the cover 808.

The handle 802 can define a button aperture 848 that allows for a button 846 to be received. The button 846 may couple to the block 824 through adhesion, friction, or a fastener. In at least one embodiment, the button 846 is configured to allow for the removal of the handle 802 from a combination of the block 824, strap 820, or closure mechanism 806. In at least one example, when the button 846 is depressed, the handle 802 can be removed.

Figure 9:
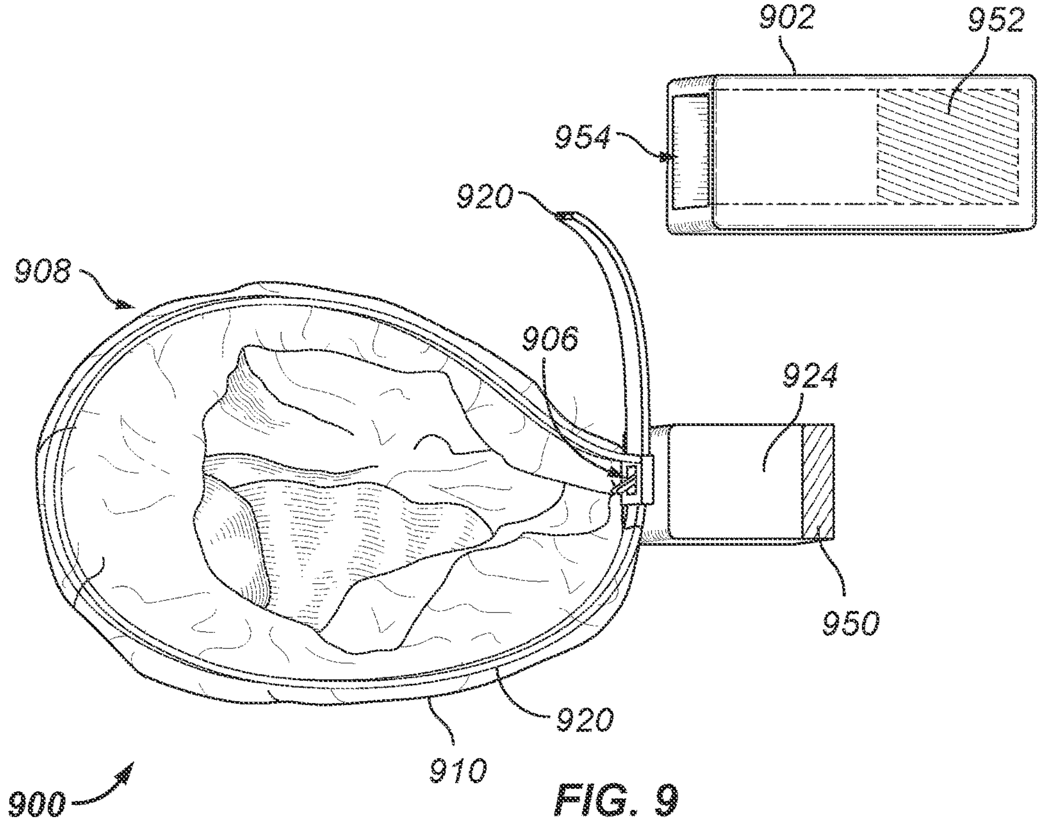
FIG. 9 is an illustration of a plunger cover apparatus.

FIG. 9 is an illustration of a plunger cover apparatus 900. The plunger apparatus cover 900 in at least one embodiment may include a handle 902 that defines a block aperture or void 954 for receiving a block 924. In at least one embodiment, the handle 902 may include a handle magnet 952 for magnetically engaging with a block magnet 950. For example, the block 924 include a block magnet 950. In at least one example, the block magnet 950 can be coupled to the block 924 through an adhesive such as, but not limited to, glue or other adhesive material, or a fastener such as, but not limited to, a screw or bolt. Similarly, the handle magnet 952 can be coupled to the block 924 through an adhesive such as, but not limited to, a glue, or other adhesive material, or a fastener such as, but not limited to, a screw or bolt.

The block 924 can be configured to couple to a closure mechanism 906 that includes a strap 920. For example, the strap 920 may be a zip, cable, or pull tie with a ratcheting or locking feature that creates a securing engagement. The closure mechanism 906 may be glued, friction fit, or otherwise engaged with the block 924 through an aperture. The cover 908 may have a cover aperture 910 for receiving a strap 920.

Figure 10A:
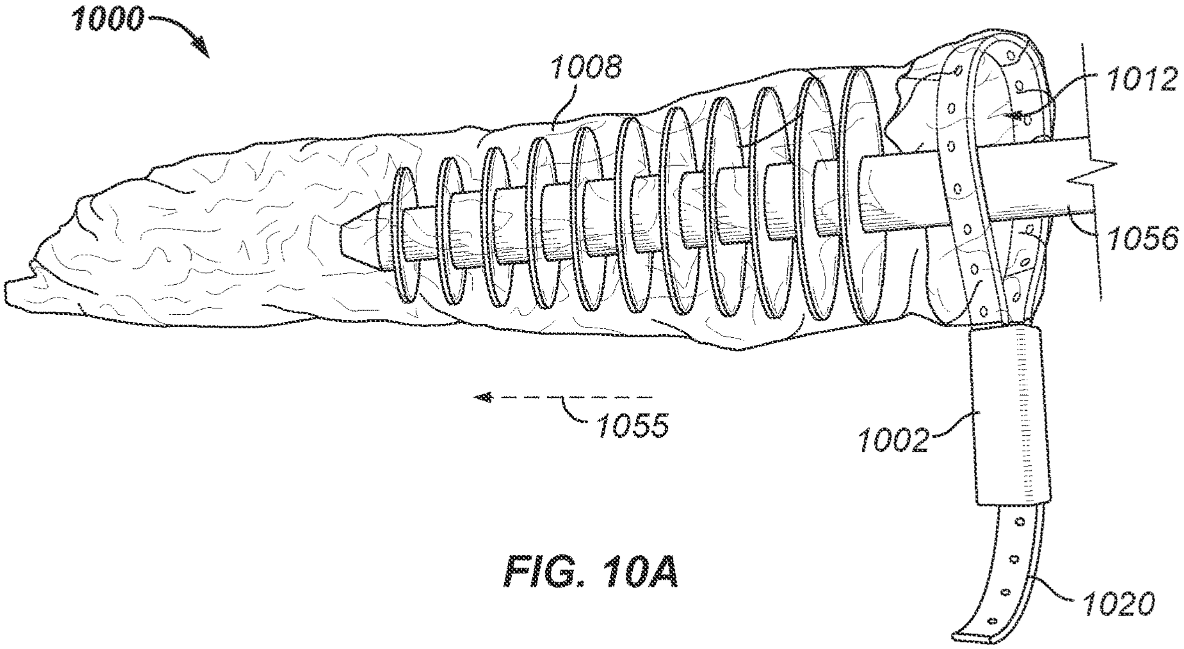
FIG. 10A is an illustration of a plunger insertion into a plunger cover system.
Figure 10B:
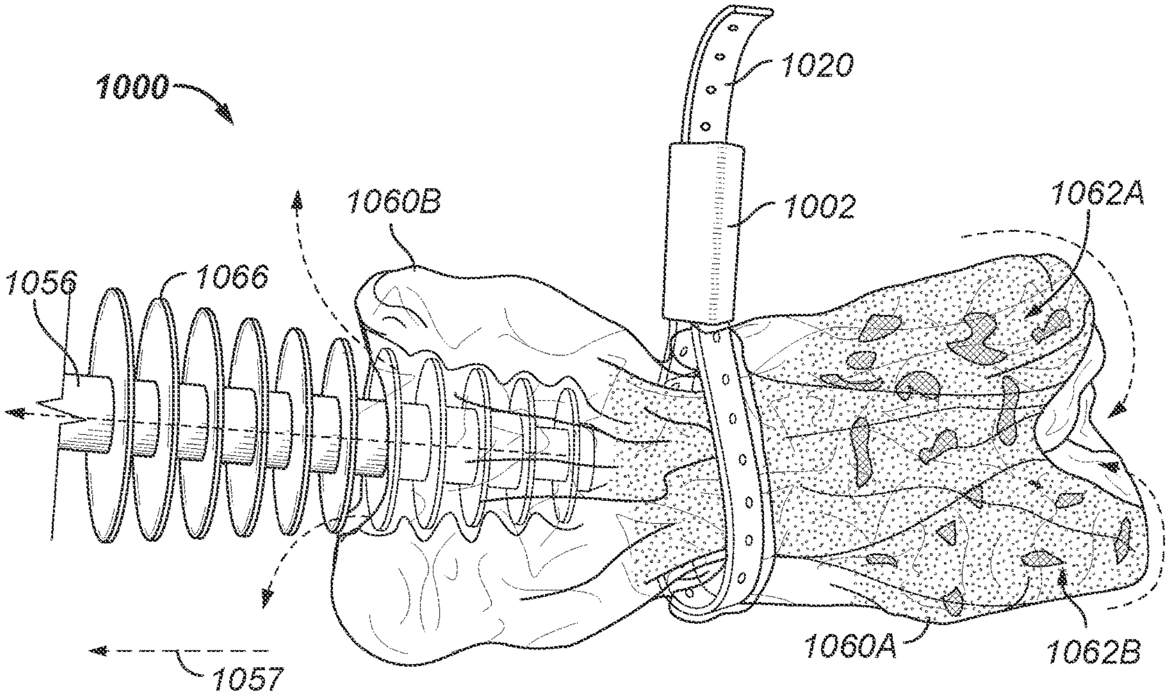
FIG. 10B is an illustration of a plunger removal from a plunger cover system and creating an inverted cover.
Figure 10C:
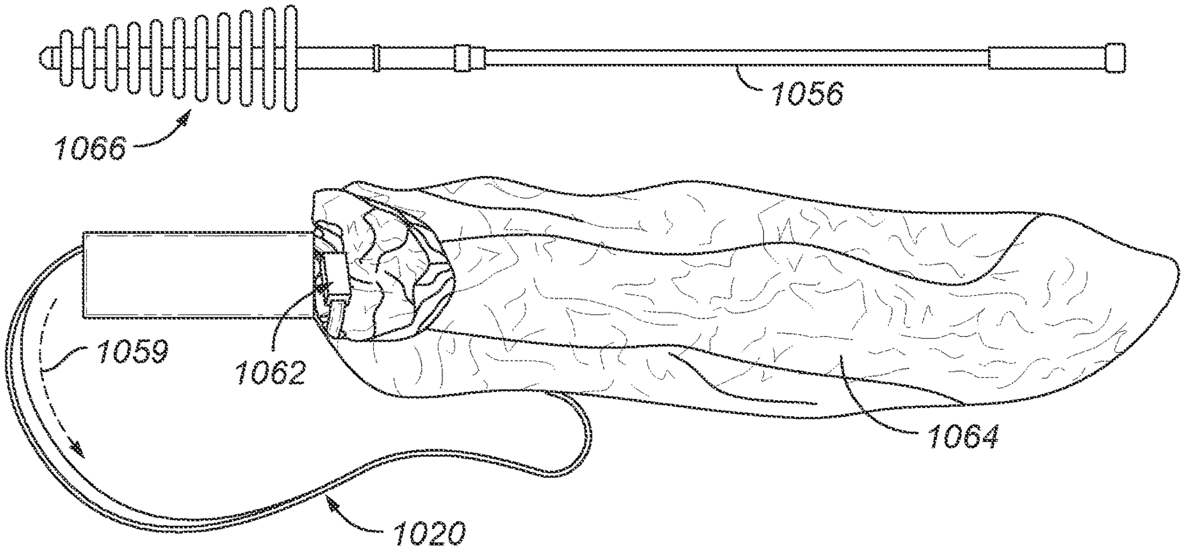
FIG. 10C is an illustration of a plunger and a closed cover.

FIG. 10A is an illustration of the insertion of a plunger 1056 into a plunger cover system 1000. FIG. 10B is an illustration of the removal of a plunger 1056 from a plunger cover system 1000 and inversion of the cover 1008. FIG. 10C is an illustration of a plunger 1056 and a closed cover 1062. With reference to FIGS. 10A, 10B, and 10C, a plunger 1056 may be inserted into a plunger cover system 1000 through a plunger cover opening 1012. The plunger cover system 1000 can include a handle 1002 with a closure mechanism or a strap 1020. The strap 1020 can interact with a cover 1008 to define a cover opening 1012. The plunger 1056 can be inserted 1055 into the cover 1008 through the cover opening 1012. After insertion, the plunger 1056 can be utilized to plunge or clean a toilet, pipes, or drain systems (not illustrated).

After use, the plunger 1056 can be removed 1057 from the plunger cover system 1000. In at least one embodiment, the removal 1057 is in the opposite direction of the insertion 1055. As the plunger 1056 is removed from the cover 1008 through the cover opening 1012, the orientation of the cover 1008 can be inverted or reversed. For example, an outer surface 1060A of the cover 1008 can have water 1062A or waste material 1062B on the outer surface 1060A of the cover 1008. Further to this example, an inner surface 1060B can remain clean after use of the plunger 1056. During removal of the plunger, because of the inversion or reversal of the cover 1008, the outer surface 1060A becomes an inner surface, while the inner surface 1060B becomes an outer surface. By utilizing the plunger cover system 1000, a plunger head 1066 remains clean during and after use.

After the removal of the plunger 1056 from the plunger system 1000, a user can apply a force 1059 to a strap 1020. The force 1059 can cause the cover 1008 or cover opening 1012 to close, creating a closed cover 1064. When the cover 1008 is closed, water and waste material is kept within the inverted cover. The plunger cover system 1000, the cover 1008, or closure mechanism can then be thrown away or recycled. In some examples, the cover 1008 may be biodegradable.

Figure 11A:
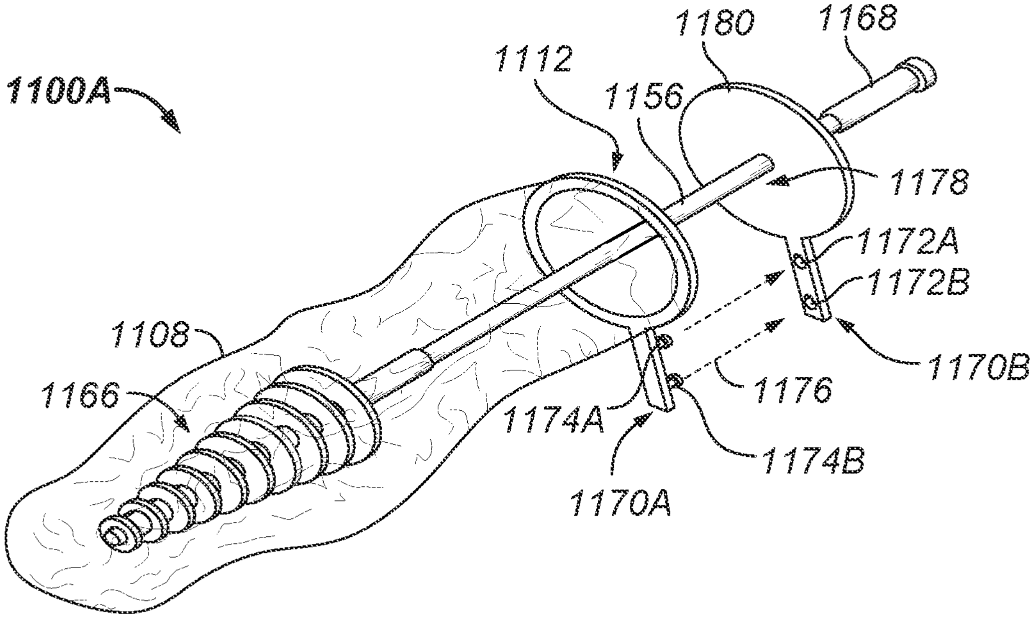
FIG. 11A is a perspective view illustration of a plunger cover system.
Figure 11B:
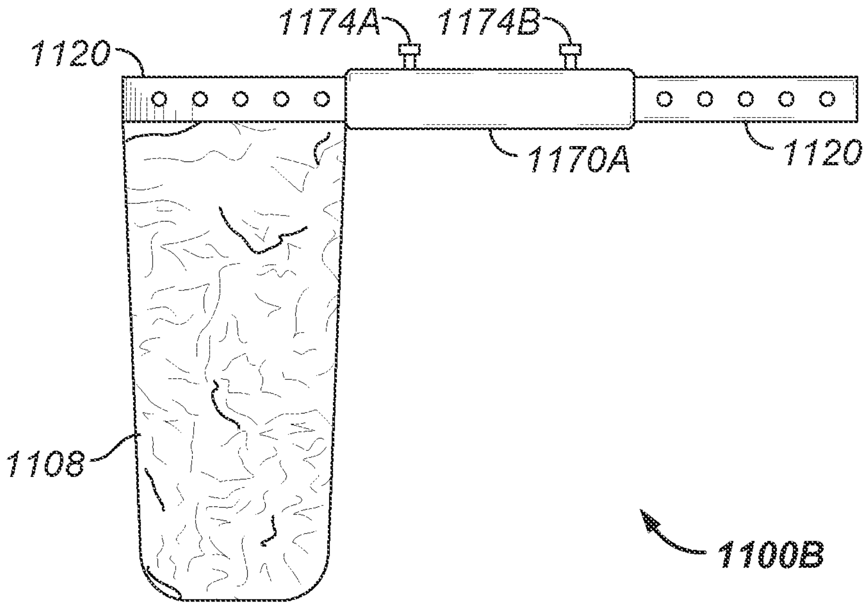
FIG. 11B is a side view illustration of a plunger cover system.

FIG. 11A is a perspective view illustration of a plunger cover system 1100A. FIG. 11B is a side view illustration of a plunger cover system 1100B. With reference to FIGS. 11A and 11B, the plunger cover system 1100 can include a locking system, a cover 1108, a set of handles 1170A/1170B, or a closure mechanism. A plunger 1156 or plunger head 1166 may be inserted into a cover 1108 through a cover opening 1112. The cover opening 1112 can be defined by the interface of a strap 1120 or other closure mechanism and the cover 1108. The strap 1120 or closure mechanism may be part of a first handle 1170A. The first handle 1170A may engage with a second handle 1170B. In at least one example, the first handle 1170A may have a cover opening 1112, while the second handle 1170B can have a solid cross-sectional surface 1180. In at least one example, the first handle 1170A may be split in half, and have a hinge that allows for the opening 1112 to be closed through adhesive, fasteners, magnetics, or other closing means.

The locking of the set of handles 1170A/1170B, in at least one example, may occur through a set of locking apertures 1172A/1172B that engages with a set of locking posts 1174A/1174B. Other manners of locking may include, but are not limited to, sliding, friction fit, tongue and groove, dove tail, snaps, magnetic, electro-mechanical, electro-magnetic, or other devices configured to create a locking engagement between the handles 1170A/1170B. The handles 1170A/1170B may be engaged through an engagement movement 1176. When engaged, the plunger 1156 can have a plunger head end (distal end) 1166 that is opposite a plunger handle end (proximal end) 1168. In at least one example, the plunger handle end 1168 would be closer to the set of handles 1170A/1170B (collectively 1170) than the plunger head end 1166.

The set of handles 1170 in interaction with the plunger 1156 can allow for a user to apply additional pressure or force during a plunging operation. In at least one embodiment, the plunger 1156 may have a rod 1178 connecting the plunger head end 1166 with the plunger handle end 1168. The rod 1178 may, in some examples, be separable into two or more sections. The rod 1178 can also be secured to the second handle 1170B. Through the securing of the rod 1178 and second handle 1170B, a user may have multiple points with which to hold the plunger cover system 1100 or plunger 1156. As illustrated in FIGS. 10A, 10B, and 10C, the cover 1108 can be reversed or inverted to allow a user to contain water or waste materials.

Figure 12:
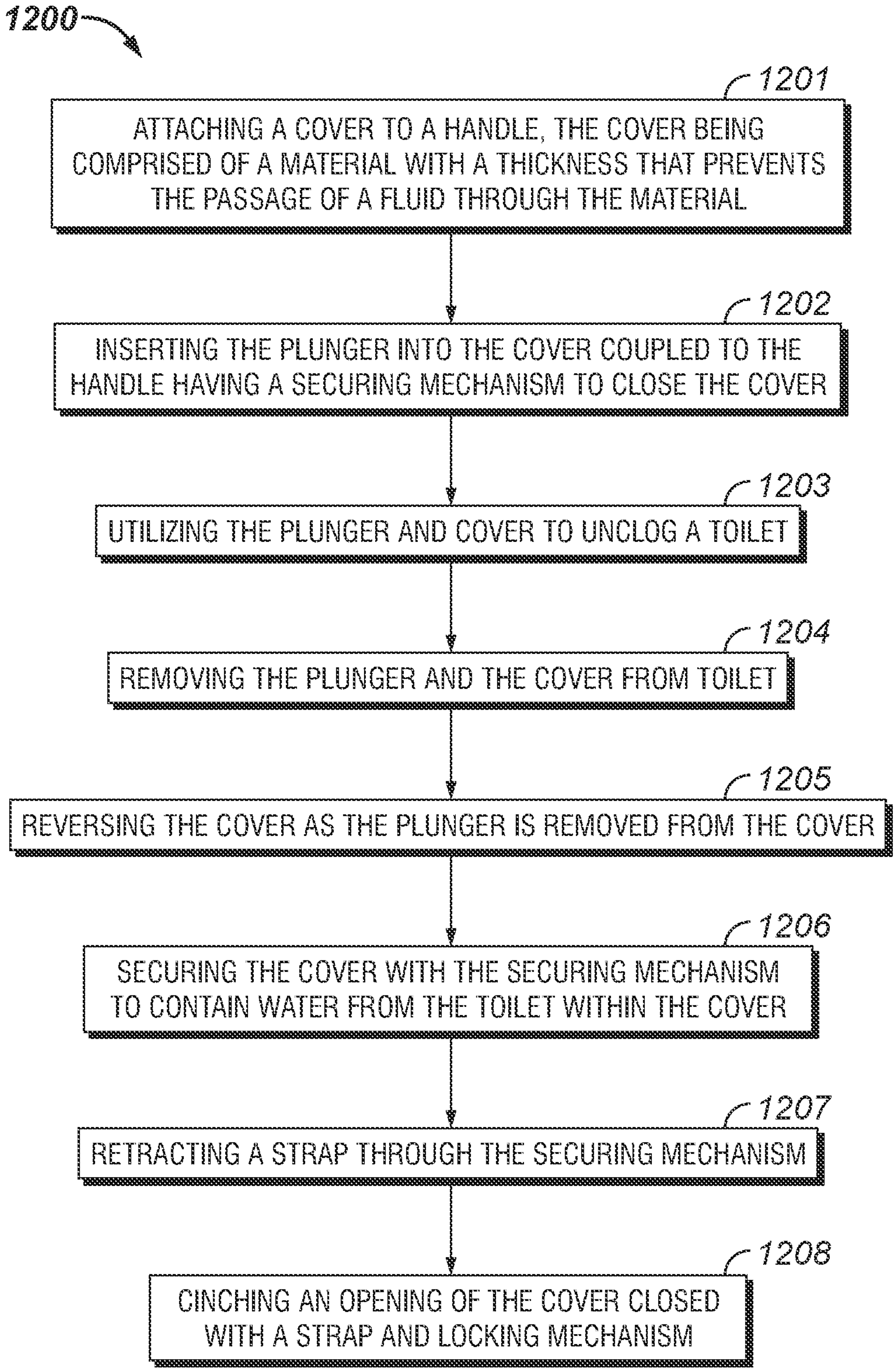
FIG. 12 is an illustration of a method of use for a plunger cover system.

FIG. 12 is an illustration of a method of use 1200 for a plunger cover system. In at least one embodiment, a user begins by attaching a cover to a handle. The cover may be manufactured from a nonpermeable material with a thickness that prevents the passage of a fluid, especially water, through the material 1201. In some examples, the material may be a thin film polymer or polyurethane that is impermeable to water or other fluids. In some examples, the cover may also include a closure mechanism that allows for attachment or engagement with the handle. The closure mechanism may include a strap.

In another step, the plunger is inserted into the cover coupled to the handle 1202. In some examples, the cover may couple to a strap or closure mechanism on the handle. A user may also perform a plunging operation, utilizing the plunger and cover system to unclog a toilet 1203. In at least one example, the plunger could be replaced with a toilet brush, or a scooper for other messes such as, but not limited to, dog poop or cat litter. Additionally, while unclogging the toilet has been provided as an illustration, in some examples the cover or cover system may also be utilized for cleaning a yard or a litter box.

In another step, the plunger and cover are removed from toilet 1204. A user may allow the cover and plunger to remain over the toilet before, during and after use. A user may then, in at least one embodiment, begin reversing the cover by removing the plunger from the cover 1205. By reversing the cover, an inversion of the cover occurs causing any water, fluid, or waste material on the outside of the cover to be contained within the inverted cover, preventing a user from touching, dripping, or coming in contact with the fluid, water, or waste materials.

In another step, the cover is closed using the closure mechanism, which contains water from the toilet within the cover 1206, where the closure can occur through retracting a strap through the closure mechanism 1207. Alternatively, the closure may occur through cinching an opening of the closed cover with a strap and locking mechanism 1208.

While this disclosure has been particularly shown and described with reference to preferred embodiments, it will be understood by those skilled in the art that various changes in form and detail may be made therein without departing from the spirit and scope of the invention. The inventors expect skilled artisans to employ such variations as appropriate, and the inventors intend the invention to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, and by way of example, although the headings refer to a “Technical Field,” the claims should not be limited by the language chosen under this heading to describe the so-called field. Further, a description of a technology as background information is not to be construed as an admission that certain technology is prior art to any embodiment(s) in this disclosure. Neither is the “Brief Summary” to be considered as a characterization of the embodiment(s) set forth in issued claims. Furthermore, any reference in this disclosure to “invention” in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

We claim:

1. A system for covering and utilizing a plunger comprising:

a reversible cover for receiving the plunger;

a handle defining at least one aperture wherein the at least one aperture extends along the handle’s length, and the handle is independent of the plunger; and a closure mechanism engaged with the reversible cover inserted in the at least one aperture and the closure mechanism extending through the handle.

2. The system of claim 1, wherein the reversible cover comprises a first open end for receiving the plunger and allowing the plunger to move towards a second closed end of the reversible cover.

3. The system of claim 1, wherein the reversible cover has an elongated structure.

4. The system of claim 1, wherein the reversible cover has cylindrical structure between the first open end and the second closed end.

5. The system of claim 1, wherein the reversible cover is reversed when the plunger is removed.

6. The system of claim 1, wherein the handle comprises a handle body that is configured to receive a portion of the closure mechanism.

7. The system of claim 1, wherein the closure mechanism comprises a locking cylinder and a locking block.

8. The system of claim 1, wherein the closure mechanism comprises a strap.

9. An apparatus for covering a plunger comprising:

a handle independent of the plunger;

a closure mechanism engaged with a handle aperture, wherein the handle aperture extends the handle’s length, and the closure mechanism extends past the handle’s length; and a cover engaged with the closure mechanism to define an elongated structure for receiving the plunger at the open end moving towards the closed end.

10. The apparatus of claim 9, wherein the handle further comprises a handle body having a proximal end, and a distal end.

11. The apparatus of claim 9, wherein the closure mechanism is at a distal end of the handle.

12. The apparatus of claim 9, wherein the cover is further made of a nonpermeable material with a thickness that prevents the passage of a fluid through the nonpermeable material.

13. The apparatus of claim 9, wherein the elongated structure of the cover is cylindrical.

14. The apparatus of claim 9, wherein the closure mechanism further comprises a strap.

15. The apparatus of claim 9, wherein the cover defines an open end of the cover, and a closed end opposite the open end and closure mechanism.

* * * * *